(12) United States Patent
Trindade et al.

(10) Patent No.: US 8,227,544 B2
(45) Date of Patent: *Jul. 24, 2012

(54) ACRYLIC POLYOL COATING COMPOSITION

(75) Inventors: Delson Jayme Trindade, Rochester Hills, MI (US); Peter William Uhlianuk, Romeo, MI (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/391,602

(22) Filed: Feb. 24, 2009

(65) Prior Publication Data

US 2009/0162559 A1 Jun. 25, 2009

Related U.S. Application Data

(62) Division of application No. 11/999,165, filed on Dec. 4, 2007, now abandoned.

(51) Int. Cl.
C08L 75/00 (2006.01)
C08G 18/28 (2006.01)
B05D 3/02 (2006.01)

(52) U.S. Cl. ...... 525/125; 525/124; 525/452; 427/388.2
(58) Field of Classification Search ............... 525/124, 525/452

See application file for complete search history.

(56) References Cited

U.S. PATENT DOCUMENTS

| | | | |
|---|---|---|---|
| 4,226,901 A | 10/1980 | Sugiura et al. | |
| 4,546,046 A | 10/1985 | Etzell et al. | |
| 4,720,528 A | 1/1988 | Etzell et al. | |
| 4,880,889 A * | 11/1989 | Jung et al. | 526/323 |
| 5,574,102 A | 11/1996 | Tanigami et al. | |
| 5,646,213 A | 7/1997 | Guo | |
| 5,955,532 A * | 9/1999 | Chang et al. | 524/504 |
| 5,977,256 A * | 11/1999 | Huybrechts et al. | 525/131 |
| 6,538,059 B1 | 3/2003 | Muller et al. | |
| 6,716,891 B1 * | 4/2004 | Meisenburg et al. | 522/90 |
| 6,863,929 B2 | 3/2005 | Watanabe et al. | |
| 7,740,912 B2 * | 6/2010 | Uhlianuk et al. | 427/385.5 |
| 7,867,569 B2 * | 1/2011 | Hazan et al. | 427/385.5 |
| 2002/0001708 A1 | 1/2002 | Flaherty et al. | |
| 2004/0115356 A1 * | 6/2004 | Zarse et al. | 427/407.1 |
| 2004/0131786 A1 | 7/2004 | Ma et al. | |
| 2004/0147648 A1 | 7/2004 | Corcoran et al. | |
| 2004/0258923 A1 | 12/2004 | Sormani et al. | |
| 2005/0161330 A1 * | 7/2005 | Toi et al. | 204/484 |
| 2008/0131607 A1 * | 6/2008 | Trindade et al. | 427/387 |

FOREIGN PATENT DOCUMENTS

| | | |
|---|---|---|
| AU | 699083 B | 11/1998 |
| JP | 2923125 B2 | 7/1999 |
| JP | 2952456 B2 | 9/1999 |
| JP | 2001002736 A | 1/2001 |

* cited by examiner

Primary Examiner — Randy Gulakowski
Assistant Examiner — Mike M Dollinger
(74) Attorney, Agent, or Firm — Brian J Myers

(57) ABSTRACT

This invention is directed to a coating composition comprising an coating composition comprising a crosslinkable composition and a crosslinking composition. The crosslinkable composition comprises an acrylic polyol wherein the acrylic polyol comprises at least 40 percent by weight of at least one linear or branched C8 or higher alkyl acrylate monomer and at least one polyester extended acrylate monomer. The coating composition is suitable for use as a basecoat and can be used in a 3-wet paint process that eliminates the primer curing booth.

8 Claims, No Drawings

ACRYLIC POLYOL COATING COMPOSITION

CROSS REFERENCE TO RELATED APPLICATION

This application is a divisional of application Ser. No. 11/999,165 filed on Dec. 4, 2007, which claims the benefit of Provisional Application Ser. No. 60/872,675, filed Dec. 4, 2006, which is incorporated by reference herein for all purposes as if fully set forth.

FIELD OF THE INVENTION

This invention relates to a coating composition and a method of coating an automotive body or part thereof. In particular, this invention relates to a composition and a method useful for forming multi-layer coatings.

BACKGROUND OF THE INVENTION

Coating systems for automobiles normally comprise a multiplicity of coatings applied to a substrate, typically a steel substrate, which is treated with a rust-proofing phosphate layer, then a cathodic electrocoat primer for additional corrosion protection is applied. A primer (also known as a chip resistant primer, primer-surfacer, or primer filler) is used next to smooth the surface for topcoating and also to provide stone chip resistance to the coating system. Then a top-coat system is applied, sometimes as a single glossy topcoat, more often now as a basecoat with solid color or flake pigments followed by a transparent protective clearcoat, to protect and preserve the attractive aesthetic qualities of the finish on the vehicle even on prolonged exposure to the environment or weathering.

The basecoat and clearcoat compositions are normally applied as a wet-on-wet application to a layer of cured and dried primer. The basecoat layer is applied first and then optionally flashed for a short period to remove at least a portion of the solvent. The clearcoat is then applied to the uncured basecoat and then the basecoat and clearcoat layers are subsequently cured at the same time to form a dried and cured finish. In the conventional method for forming the multi-layer coating film, the underlying primer surfacer layer, however, is cured before being overcoated with basecoat and clearcoat. Historically, cured primers have been used not only to provide a smooth surface on which to apply the topcoat, but also to also prevent interfacial bleeding or intermixing with the overlying basecoat and to avoid disrupting the appearance of the overall topcoat finish. Resistance to intermixing, sometimes referred to as "strike-in" resistance, is especially important for the appearance of glamour metallic finishes which are popular nowadays on automobiles and trucks. Any disturbance of the metallic pigment flake orientation in metallic basecoats after application over the primer-surfacer will detract from the metallic effect of the finish. Therefore, care must be taken to ensure that the metal pigment flakes are not disturbed after painting.

When the paint applied to a substrate contains a metallic effect pigment, the flop index of the dried and cured paint is an important measure of quality. It is important for the metallic effect pigments to orient parallel to the underlying surface to maximize the flop. Generally, basecoats are applied in two thin layers which helps to facilitate the orientation of the metallic flake parallel to the underlying surface. When a majority of the metallic flakes are oriented parallel to the underlying surface, the flop, or brightness change on viewing angle is maximized resulting in a highly desirable effect. To apply two thin layers, an automobile paint facility typically employees a series of two separate spray stations one positioned directly after the other. Since each spray station may use several spray guns, the capital investment for the basecoat spray booth is significant.

In recent years, it has also been strongly desired to reduce the environmental load or impact of automotive assembly plants by reducing VOC (volatile organic compounds) emissions and $CO_2$ (carbon dioxide) emissions generated from operating painting booths and baking ovens. This has led to the use of lower solvent content in the paint and the development of three-layer wet paint systems which make it possible to apply a primer, basecoat and clearcoat wet-on-wet continuously before they are cured all at once in a single bake. With this simplified application process, it is possible to eliminate the separate primer painting booth and primer oven, which also results in substantial cost savings to the automobile manufacturers. The technical hurdles of this process simplification, however, have been significant. For instance, interfacial bleeding and aesthetic appearance, as well as film properties such as chip resistance are still significant concerns.

Attempts have been made to address the forgoing problems by modifying the formulation of the primer coating material. U.S. Pat. No. 6,863,929 of Watanabe et al. describes a method for forming a multilayer automotive coating film using a three layer wet paint process (also referred to as a "3-wet" or a "3-coat-1-bake" process) wherein a standard polyester-melamine primer coating is formulated to also contain acrylic polymer particles, namely in the form of internally crosslinked nonaqueous dispersion (NAD) polymers or internally crosslinked microgel particles. These particles are intended to raise the viscosity and solubility parameter between the primer surfacer and the base coating to prevent intermixing at the interface between the coated layers. However, use of such particle-filled systems also suffers from some drawbacks.

For example, the microparticles also tend to create voids in the surface of the wet primer where the basecoat can still flow in and intermix, resulting in defects in the aesthetic appearance such as loss of smoothness, gloss, head on brightness, and/or metallic effect. Sagging of these coatings, especially on vertical panels, such as doors, fenders, rocker panels, etc, is also a problem. These particle-filled systems are also not able to maintain dry film builds at normal commercial levels. Film builds must therefore be reduced to allow the NAD or microgel particle to migrate to the interface. Yet, thin films are an impediment as they tend to subject the underlying corrosion-protective electrocoated primer layer to excessive UV light transmission and deterioration. Thin films or thin film regions are also inadequate for mechanical properties and visual appearance of the overall finish.

Therefore, there is still a need to find a more effective way to prevent the intermixing of the primer surfacer and basecoat and clearcoat layers when applied in a wet-on-wet-on-wet (i.e., a 3-wet) manner and make it possible to eliminate the primer baking process and reduce the environmental impact of the coating system, while also maintaining film builds, the overall appearance such as high gloss and distinctness of image and film properties of the coating system.

SUMMARY OF THE DISCLOSURE

In one aspect, the present invention is a coating composition comprising a crosslinkable component and a crosslinking component wherein:

(a) the crosslinkable component comprises an acrylic polyol wherein the acrylic polyol comprises at least one linear or branched C8 or higher alkyl acrylate monomer, and at least one polyester-extended acrylate monomer, and
(a) the crosslinking component comprises at least one of the group selected from melamine, amino resin, polyisocyanate, blocked polyisocyanate, or a combination thereof; and
wherein the total weight percentage of the linear or branched C8 or higher alkyl acrylate monomers and polyester-extended acrylate monomers is at least 40.

The present disclosure is also related towards a process for using the coating composition comprising sequentially applying a layer of a primer composition, a layer of a basecoat composition and a layer of a clearcoat composition on a substrate; and simultaneously curing the applied layers by heating;
wherein the basecoat composition comprises a crosslinkable component, a crosslinking component, an organic liquid carrier, and optionally pigments; wherein
a) the crosslinkable component comprises an acrylic polyol wherein the acrylic polyol comprises at least one linear or branched C8 or higher alkyl acrylate monomer, and at least one polyester-extended acrylate monomer, and
b) the crosslinking component comprises at least one of the group selected from melamine, amino resin, polyisocyanate, blocked polyisocyanate, or a combination thereof; and
wherein the total weight percentage of the linear or branched C8 or higher alkyl acrylate monomer and polyester-extended acrylate monomer is at least 40.

DETAILED DESCRIPTION OF THE DISCLOSURE

In this disclosure, a number of terms and abbreviations are used. The following definitions are provided.

"Wet-on-wet" means that the basecoat layer and clearcoat layer are applied successively to a cured primer layer without a curing step in between the basecoat and clearcoat layers.

"Wet-on-wet-on-wet", also used interchangeably herein with "three layer wet", "3-wet", and "3-coat-1-bake", means that the primer layer, basecoat layer, and clearcoat layer are applied successively in a wet-on-wet manner.

"substantially free" with respect to the coating composition shall mean that the coating composition contains less than 1% by weight, preferably zero percent by weight, of the specified component, based on the total weight of the composition.

"High solids composition" means a solvent-borne liquid coating composition having a total solids content at the time of application of at least 40 weight percent, preferably in the range of from 40 weight percent to 90 weight percent, based on the total weight of the coating composition.

"Total solids" refers to the total amount of non-volatile components in the composition even though some of the components may be non-volatile liquids rather than solids at room temperature.

In this disclosure, the term "binder" or "binder solids" refers to the crosslinkable component and the crosslinking component, and all other optional film-forming components. The binder generally includes all the film-forming components that contribute to the solid organic portion of the cured composition. Generally, catalysts, pigments, and non-polymeric chemical additives such as stabilizers described hereinafter are not considered part of the binder solids. Non-binder solids other than pigments usually do not amount to more than about 5-15% by weight of the composition.

"Acrylate" describes methacrylate as well as acrylate.

"Acrylic polyol" means a polymer formed from a monomer mixture wherein the monomer mixture contains greater than 50 percent by weight of acrylate monomers, and the acrylic polyol has on average more than 1.0 hydroxy groups per molecule.

Polyester-extended acrylate means a monomer of the formula;

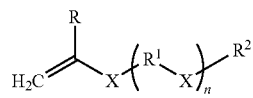

wherein each X is independently selected from the group C(O)O and OC(O); R is H or $CH_3$; R1 is alkyl, aryl, alkylaromatic, or aromaticalkyl; R2 is hydroxy terminated alkyl, aryl, alkylaromatic, or aromaticalkyl; and n is an integer in the range of from 1 and 20. Preferably, the polyester-extended acrylic monomer is the reaction product of 2-hydroxyethyl acrylate or 2-hydroxyethyl methacrylate and caprolactone. One such product is commercially available from Dow Carbide as TONE M-100®.

"Polyester-extended polymer" means a polymer that has, on average, at least one polyester-extended monomer per polymer chain.

As used herein, the term 'substrate' means any surface, such as metal, wood, resin, asphalt, or any other surface. The substrate may be previously coated with a material, such as, but not limited to, an electrodeposition primer, a primer, a primer/sealer, or a pigmented coating.

"Flop" or "flop index" is the measurement on the change in reflectance of a metallic color as it is rotated through the range of viewing angles.

"Crosslinkable component" means a component that has functional groups appended thereon that are capable of reacting with the crosslinking component to form a crosslinked network. The crosslinkable component may comprise a compound, oligomer, polymer, or a combination thereof having at least one functional group reactive with the crosslinking component. Preferably the crosslinkable component comprises an acrylic polyol. The functional groups in the crosslinkable component can be chosen from hydroxy, amino, hydroxy silane, alkoxysilane, epoxy, carbamate, carboxy, anhydride, or a combination thereof. The preferred functional group is hydroxy.

"Crosslinking component" means a component that is capable of reacting with the functional groups on the crosslinkable component to form a crosslinked network. The crosslinking component can be chosen from the group consisting of melamine, amino resin, polyisocyanate, blocked polyisocyanate, or a combination thereof.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

The present invention is directed to a coating composition comprising a crosslinkable component and a crosslinking component wherein;
(a) the crosslinkable component comprises an acrylic polyol wherein the acrylic polyol comprises at least one linear or branched C8 or higher alkyl acrylate monomer, and at least one polyester-extended acrylate monomer, and
(b) the crosslinking component comprises at least one of the group selected from melamine, amino resin, polyisocyanate, blocked polyisocyanate, or a combination thereof; and wherein the total weight percentage of the linear or branched C8 or higher alkyl acrylate monomers and polyester-extended acrylate monomers is at least 40. The composition disclosed herein is useful as a basecoat or a glossy topcoat.

The acrylic polyol disclosed herein is used as a crosslinkable component of the coating composition. The acrylic polyol is a copolymer that is polymerized from a mixture comprising at least one C8 or higher alkyl acrylate monomer and at least one polyester-extended acrylate monomer. The acrylic polyol contains at least 40 percent by weight of a combination of these two types of monomers. The acrylic polyol has a weight average molecular weight in the range of from 2,000 to 150,000, more preferably in the range of from 3,000 to 100,000.

When the acrylic polyol is used as a component of the basecoat composition in a 3-wet application process, it is preferred to use an acrylic polyol with a weight average molecular weight in the range of from 3,000 to about 45,000. It has been found that at molecular weights lower than 3,000, the coatings begin to exhibit some strike-in. Strike-in refers to the intermixing of two wet layers of paint. Strike-in causes a degradation in the appearance of the cured and dried paint layers. Above a molecular weight of 45,000, the surface appearance begins to degrade and the flop measurement goes down.

Suitable $C_8$ or higher alkyl acrylate monomers include monomers of formula;

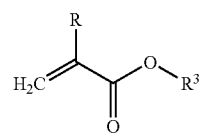

wherein R is H or $CH_3$ and $R^3$ is a linear or branched alkyl having 8 or more carbons. Preferably, $R^3$ has more than 10 carbons and more preferably, $R^3$ has more than 12 carbons. $R^3$ is not particularly limited as to an upper limit of carbon atoms. However, at greater than 30 carbons, the monomers tend to be solids which are harder to handle in production and the $T_g$ of polymers produced using these monomers tends to be too low to make a suitable coating.

Examples of suitable linear or branched C8 or higher alkyl acrylate monomers include octyl acrylate, octyl methacrylate, nonyl acrylate, nonyl methacrylate, decyl acrylate, decyl methacrylate, undecyl acrylate, undecyl methacrylate, dodecyl acrylate, dodecyl methacrylate, isodecyl acrylate, isodecyl methacrylate, isotridecyl acrylate, isotridecyl methacrylate, tridecyl acrylate, tridecyl methacrylate, tridecyl acrylate, tridecyl methacrylate, lauryl acrylate, lauryl methacrylate, stearyl acrylate, and stearyl methacrylate. Combinations thereof are also useful.

Preferably the $C_8$ or higher alkyl acrylate monomers comprise in the range of from 10 percent to 60 percent by weight of the monomers in the acrylic polyol, more preferably, the $C_8$ or higher alkyl acrylate monomers comprise in the range of from 26 percent to 55 percent by weight of the monomers in the acrylic polyol, most preferably, the C8 or higher alkyl acrylate monomers comprise in the range of from 39 percent to 50 percent by weight of the monomers in the acrylic polyol. For example, if one uses 10 percent by weight of the C8 or higher alkyl acrylate monomer then the polyester extended acrylate monomer must comprise at least 30 percent by weight of the acrylic polyol.

The acrylic polyol also comprises at least one polyester-extended acrylate monomer of the formula;

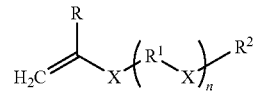

wherein each X is independently selected from the group C(O)O and OC(O); R is H or $CH_3$; $R^1$ is alkyl, aryl, alkylaromatic, or aromaticalkyl; $R^2$ is hydroxy terminated alkyl, aryl, alkylaromatic, or aromaticalkyl; and n is an integer from 1 to 20. Preferably, the polyester-extended acrylic monomer is the reaction product of 2-hydroxyethyl acrylate or 2-hydroxyethyl methacrylate and caprolactone. One such product is commercially available from Dow Carbide as TONE M-100®.

The acrylic polyol comprises at least 40 percent by weight of at least one linear or branched C8 or higher alkyl acrylate and at least one polyester-extended acrylate monomer. The remaining portion of the acrylic polyol may further comprise monomers having no crosslinkable functional groups and/or monomers having crosslinkable functional groups such as amino groups, carbamate, alkoxy silane such as trimethoxy silane, epoxy, carboxy groups, anhydride groups, or a suitable combination thereof, to impart additional crosslinking functionality to the polymer and enhance the integrity of the cured coating. The number of functional groups may vary, depending on the final properties desired. These functional groups can be introduced by employing a functional monomer comprising the desired group in the polymerization process or by post-reaction of the acrylic polyol to introduce the desired additional functionality, as will be apparent to those skilled in the art.

Examples of useful amine-containing monomers are N,N-dimethylaminoethyl methacrylate, N,N-dimethylaminoethyl acrylate, N-t-butylaminoethyl methacrylate, N-t-butylaminoethyl acrylate, 2-aminoethyl methacrylate, 2-aminoethyl acrylate.

Examples of useful carbamate containing monomers include adducts of aliphatic alcohols with isocyanate containing acrylates or methacrylates. Methods for preparation if carbamate functionalized acrylics are well known in the art and described, for example, in EP 0 594 142 B1 and EP 0 719 795 B1, the disclosures of which are hereby incorporated by reference herein.

Examples of such functional monomers are silane-containing monomers, particularly alkoxy silanes such as gamma-acryloxypropyl trimethoxysilane, gamma-methacryloxypropyl trimethoxysilane (SILQUEST® A-174 from Crompton), and gamma-methacryloxypropyltris(2-methoxyethoxy)silane.

Examples of useful epoxy containing monomers are glycidyl methacrylate and glycidyl acrylate and any acrylic monomer with a hydroxy group that can be reacted with epichlorohydrin to produce the epoxy group containing monomers.

Examples of carboxy or anhydride containing monomers are acrylic acid, methacrylic acid, maleic anhydride, and fumaric anhydride.

Examples of monomers having no crosslinkable functionality include alkyl acrylates such as methyl acrylate, ethyl acrylate, propyl acrylate, isopropyl acrylate, butyl acrylate, isobutyl acrylate, hexyl acrylate, cyclohexyl acrylate, propyl acrylate, phenyl acrylate, isobornyl acrylate, methyl methacrylate, ethyl methacrylate, butyl methacrylate, t-butyl methacrylate, hexyl methacrylate, cyclohexyl methacrylate, propyl methacrylate, phenyl methacrylate, isobornyl methacrylate; styrenes or substituted styrenes, such as 4-methyl styrene, alpha-methyl styrene; acrylonitrile, and methacrylonitrile, acrylamide, methacrylamide, or a combination thereof.

One preferred acrylic polyol comprises styrene, butyl methacrylate, TONE M-100®, isotridecyl methacrylate, and acrylic acid. Another preferred acrylic polyol comprises styrene, isodecyl methacrylate, TONE M-100, isotridecyl methacrylate, and acrylic acid.

The monomers used to produce the acrylic polyol can be polymerized using methods known to those skilled in the art. Preferably, the acrylic polyol is prepared by a solution polymerization method in which the monomers are blended with a liquid reaction medium, a free radical polymerization initiator, optionally caprolactone modified monomer, optionally a polymerization catalyst for the caprolactone, and optionally a chain transfer agent, and heated to 75° C. to 165° C. for a sufficient time, typically for 2 to 8 hours, to form a polymer.

As indicated above, the free radical polymerization portion of the process used herein to form the acrylic polyol backbone is preferably carried out using conventional techniques, such as by heating the monomers in the presence of a free radical polymerization initiator, typically, tertiary butyl perbenzoate, tertiary butyl peroctoate, cumene hydroperoxide, benzoyl peroxide, di-tertiary butylperoxide, di-cumene peroxide, methyl ethyl ketone peroxide or similar peroxy compounds, or an azo compound such as azobisisobutyronitrile is employed. The amount of free radical polymerization initiator can be varied depending upon the desired molecular weight but 0.05-8 percent by weight based on the weight of total polymerizable monomers is typical. A preferred range is from 0.05 to 4 percent by weight. A mixture of two or more initiators may be used.

A solvent is preferably used as the liquid reaction medium. The solvent can be used at from 0 percent to about 95 percent of the total reaction mixture. Typical solvents which are used to prepare the acrylic polyol are the following: amyl acetate, toluene, ethyl acetate, acetone, methyl isobutyl ketone, methyl ethyl ketone, methyl amyl ketone, mineral spirits, ethylene glycol monoether acetates and other aliphatic, cycloaliphatic and aromatic hydrocarbons, such as xylene, esters, ethers, ketones, and other compatible solvents are conveniently used.

Optionally, a chain transfer agent is used to control the length of the acrylic polyol. The most typical chain transfer agents are sulfur compounds such as: dodecyl mercaptan, 2-mercapto ethanol, butyl mercaptan, n-octyl mercaptan, and the like. The chain transfer agent is used at about 0.5 to 6 percent by weight based on total polymerizable monomer.

In any of the processes described above, polymerization is preferably continued until the resulting acrylic polyol has the desired molecular weight to impart the desired intermixing and strike-in resistance, but still sufficiently low viscosity for use in the coating composition of the present invention.

In addition to the above film-forming acrylic polyol, the coating composition also comprises, as part of the film-forming binder, a crosslinking component, which comprises a crosslinking agent. The crosslinking agent used in the coating composition is an aminoplast resin, melamine, polyisocyanate, blocked polyisocyanate or a combination thereof. Aminoplasts resins such as melamine formaldehyde condensates are generally preferred. In general, aminoplast resins are aldehyde condensation products of melamine, urea, benzoguanamine, or a similar compound. Usually, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amine group is present can also be employed.

Of the melamine condensates, monomeric or polymeric melamine formaldehyde condensate resins that are partially or fully alkylated are generally preferred. These preferred resins are organic solvent-soluble and are commercially available under the tradename CYMEL® from Cytec Industries, Inc., West Patterson, N.J. One preferred crosslinking agent is a methylated and butylated or isobutylated melamine formaldehyde resin that has a degree of polymerization of about 1-3. Generally, this melamine formaldehyde resin contains about 50 percent butylated groups or isobutylated groups and 50 percent methylated groups. Another preferred melamine, for a good balance of properties is, a fully methylated resin known as CYMEL 303®.

The aminoplast resin crosslinking agent(s) described above can be substituted for or optionally combined with any of the conventional blocked polyisocyanate crosslinking agents for enhanced film properties. Typical blocking agents are alcohols, ketimines, oximes, pyrazoles and the like.

Other crosslinking agents can also be used, such as urea formaldehyde, benzoguanamine formaldehyde and blocked or unblocked polyisocyanates or compatible mixtures of any of the forgoing crosslinkers. For the purposes of this application, unblocked polyisocyanates are polyisocyanates that are substantially free from blocking groups, that is "free polyisocyanates".

Typical examples of polyisocyanates are isocyanate compounds having 2 to 4 isocyanate groups per molecule, such as 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Polyisocyanate condensation products can also be used. Polyisocyanates having isocyanurate, biuret, iminooxadiazine, and/or uretidione structural units are suitable. Some examples include DESMODUR N-3300® from Bayer Corporation of Pittsburgh, Pa. and the isocyanurate of isophorone diisocyanate (isocyanurate) which is available under the tradename DESMODUR Z-4470® from Bayer Corporation and the like.

Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimethylol propane and is available under the tradename of CYTHANE 3160®. When the crosslinkable resin of the present invention is used in exterior coatings, the use of an aliphatic or cycloaliphatic isocyanate is preferable to the use of an aromatic isocyanate, from the viewpoint of weatherability and yellowing resistance. An example of a suitable blocked isocyanate that can be used in the present system is a pyrazole blocked polyisocyanate of 1,6-hexamethylene diisocyanate which is available from Bayer Corporation.

To increase the rate of crosslinking of the composition on curing, a catalyst can be added to the composition. Generally, about 0.1-8 percent by weight, based on the weight of the binder, of catalyst is used. Typical of such catalyst are blocked acid catalysts. Useful blocked acid catalysts are aromatic sulfonic acids blocked with amino methyl propanol or dimethyl oxazoline. Typically useful aromatic sulfonic acids are para toluene sulfonic acid, dodecyl benzene sulfonic acid, decyl benzene sulfonic acid. One preferred catalyst is dodecyl benzene sulfonic acid blocked with amino methyl propanol.

The composition typically includes one or more solvents such as organic solvent selected from aromatic hydrocarbons, such as petroleum naphtha or xylenes; ketones, such as, methyl amyl ketone, methyl isobutyl ketone, methyl ethyl ketone or acetone; esters, such as, butyl acetate or hexyl acetate; glycol ether esters, such as propylene glycol monomethyl ether acetate; and combination thereof. The coating composition generally includes in the range of 10 percent to 60 percent, preferably 20 percent to 50 percent, more preferably 30 percent to 40 percent of the aforedescribed solvents, all the percentages being in weight percent based on the total weight of the coating composition.

Typical pigments that can be used in the coating composition are filler pigments such as talc, china clay, barytes, carbonates, silicates, and color pigment such as metallic oxides such as titanium dioxide, zinc oxide and iron oxide and carbon black and organic colored pigments and dyes. Also useful as pigments that can be added to the coating composition include the following: metallic oxides, such as titanium dioxide, zinc oxide, iron oxides of various colors, carbon black; filler pigments, such as talc, china clay, barytes, carbonates, silicates; and a wide variety of organic colored pigments, such as quinacridones, copper phthalocyanines, perylenes, azo pigments, indanthrone blues, carbazoles, such as carbozole violet, isoindolinones, isoindolones, thioindigo reds, benzimidazolinones; metallic flake pigments, such as aluminum flakes, mica flakes, pearlescent flakes, or a combination thereof. The resulting coating composition has a pigment to binder weight ratio of about 1:100-150:100.

To improve the outdoor weatherability of the composition and protect the coated substrate from premature degradation, the composition typically contains about 0.01 to 2 percent by weight, based on the weight of the binder, of ultraviolet light stabilizers which term includes ultraviolet light absorbers, screeners and quenchers. Typical ultraviolet light stabilizers include benzophenones, triazines, triazols, benzoates, hindered amines and blends of thereof.

The coating composition of the present invention can be used as the basecoat, in a basecoat/clearcoat wet on wet process. In this process, a layer of the present coating composition is applied as a basecoat to a previously coated or uncoated substrate by spraying, electrostatic spraying, roller coating, dipping, or brushing. The coating composition is optionally flashed to remove a portion of the solvent. Optionally, another layer of the basecoat composition is applied, followed by an optional flash step. The layer or layers of basecoat composition is then overcoated with a layer of clearcoat composition. Optionally, the clearcoat layer is flashed. Optionally, more than one layer of the clearcoat may be applied to the basecoat, each application being followed by an optional flash step. The combined basecoat and clearcoat layers are heated to about 60° C. to 200° C. for 60 seconds to 60 minutes to dry and cure the applied layers. By "dried and cured" or "cured" is meant that a majority (greater than 50 percent) of the solvent has been removed and that the crosslinkable and crosslinking components are substantially crosslinked, although it is understood that some additional crosslinking may occur after the curing process.

In a preferred embodiment, the coating composition of the present invention is used in a 3-wet application process. In this process, a layer of a primer composition is applied to previously coated or uncoated substrate by spraying, electrostatic spraying, roller coating, dipping, or brushing followed by an optional flash step. A layer of present coating composition is applied over the layer of primer composition as the basecoat, wherein the crosslinkable component of the basecoat comprises the disclosed acrylic polyol. The applied basecoat is optionally flashed. Optionally, multiple layers of the basecoat composition can be applied to the first layer of basecoat each optionally followed by a flash step. A single layer or multiple layers of clearcoat composition is applied to the substrate, optionally flashing between layers. The applied layers of the multi-coated substrate are then dried and cured. The drying and curing step is performed by heating the substrate to a temperature in the range of from 60° C. to 200° C. for 60 seconds to 60 minutes.

It is possible using the coating composition of this disclosure to allow a vehicle manufacturer to apply a single thick coat (up to 1.5 mils) rather than the traditional two thin coats while still achieving a very high flop index. Applying a single coating rather than two relatively thin coatings can significantly decrease the cost of painting a substrate as only half of the amount of basecoat painting equipment is needed.

It is important that the wet primer composition and the overlying basecoat composition have adequate strike-in resistance. In the 3-wet method, particularly useful 3-wet primer compositions are described below.

One useful 3-wet primer composition comprises a crosslinkable component and a crosslinking component wherein the crosslinkable component comprises about 40 to 95 percent by weight, based on the total weight of the crosslinkable component and the crosslinking component, of a polyester-extended branched acrylic polymer having a hydroxyl and/or carboxyl monomer content, all or part of which has been reacted with a cyclic lactone, of about 1 to 65 percent by weight and a weight average molecular weight of about 10,000 to 150,000; and wherein the crosslinking component that comprises about 5 to 60 percent by weight, based on the total weight of the crosslinkable component and the crosslinking component, of an aminoplast resin, a blocked polyisocyanate resin, or a combination thereof.

Another useful 3-wet primer composition comprises a crosslinkable component and a crosslinking component wherein the crosslinkable component comprises about 40 to 95 percent by weight, based on the total weight of the crosslinkable component and the crosslinking component, of a branched acrylic polymer having a hydroxyl, carboxyl, and or other crosslinkable functional group monomer content of about 1 to 65 percent by weight and a weight average molecular weight of about 10,000 to 150,000; and wherein the crosslinking component comprises about 5 to 60 percent by weight, based on the total weight of the crosslinkable component and the crosslinking component, of an aminoplast resin, a blocked polyisocyanate resin, or a combination thereof.

Another useful 3-wet primer composition comprises a crosslinkable component and a crosslinking component wherein the crosslinkable component comprises about 40 to 95 percent by weight, based on the total weight of the crosslinkable component and the crosslinking component, of a polyester-extended linear acrylic polymer having a hydroxyl and/or carboxyl monomer content, all or part of which is reacted with a cyclic lactone, of about 1 to 90 percent by weight and a weight average molecular weight of about 10,000 to 150,000; and wherein the crosslinking component comprises about 5 to 60 percent by weight, based on the total weight of the crosslinkable component and the crosslinking component, of an aminoplast resin, a blocked polyisocyanate resin, or a combination thereof.

Another useful 3-wet primer composition comprises a crosslinkable component and a crosslinking component wherein the crosslinkable component comprises about 40 to 95 percent by weight, based on the total weight of the crosslinkable component and the crosslinking component, of a film-forming acrylic polymer component comprising two acrylic polymers, the first being a polyester-extended branched acrylic polymer and the second being a polyester-extended linear acrylic polymer, the polymers being provided in a relative weight ratio of from about 5:95 to 95:5; and wherein the crosslinking component comprises about 5 to 60 percent by weight, based on the total weight of the crosslinkable component and the crosslinking component, of an aminoplast resin, a blocked polyisocyanate resin, or a combination thereof.

In the above-mentioned 3-wet primer compositions, the branched acrylic polymers and the polyester-extended branched acrylic polymers are formed via a high temperature polymerization process. This process comprises,
  (a) forming a reaction mixture of:
    (i) at least one monoacrylic monomer;
    (ii) at least one diacrylic or dimethacrylic monomer; and,
    (iii) optionally at least one monomethacrylic monomer, provided that the monomethacrylic monomer comprises no more than 40% by weight of the total monomer mixture;
    (iv) at least one free-radical polymerization initiator; and
    (v) optionally, at least one solvent; and,
  (b) maintaining the reaction mixture, under polymerizing conditions, at an elevated reaction temperature of at least 130° C. until the branched acrylic polymer is formed.

The polyester-extended branched acrylic polymer is formed by chain extending the branched acrylic polymer with a cyclic lactone or a cyclic lactone extended monomer either during or after the free-radical initiated polymerization, or a combination thereof.

In the 3-wet application process, the selection of the clearcoat composition is not particularly important, and any of the commercially available clearcoats may be chosen. Preferred clearcoat compositions are GEN IV ES® clearcoats, IMRON® clearcoats, CHROMACLEAR® clearcoats, and CHROMAPREMIER® clearcoats, all available from DuPont, Wilmington, Del.

Preferred substrates are automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; and sporting equipment.

EXAMPLES

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Unless otherwise specified, all chemicals are available from the Aldrich Company, Milwaukee, Wis.

CYMEL® 1168, monomeric melamine formaldehyde resin fully alkylated (50% methyl, 50% isobutyl) is available from Cytec Industries Inc., West Patterson, N.J.

TINUVIN® 079L (41% in xylene) is available from Ciba Specialty Chemicals Corp, Tarrytown, N.Y.

NACURE® XP-221 (aromatic sulphonic acid) is available from King Industries, Norwalk, Conn.

GARAMITE® 2578 (7% in acrylic polymer) is available from Southern Clay Products, Gonzales, Tex.

Silberline TUFFLAKE® 4615 (33% of aluminum paste in acrylic resin) is available from Silberline MFG CO INC, Tamaqua, Pa.

ATA TCR 2040A Aluminum paste is available from Toyal America, Inc., Naperville, Ill.

CF number is the determination of whether the appearance was of automotive quality, i.e., whether the coating had an aesthetic appearance that meets the standard of automotive finishes, was determined by measurements taken from a WaveScan DOI instrument from BYK Gardner. This instrument measures the visual appearance of a finish at longer wavelengths that are indicative of a condition commonly known as orange peel as well at shorter wavelengths which helps to quantify the "distinctness of image" or DOI. These parameters taken in combination (by WaveScan CF readings) can be used to quantify the overall visual appearance of a vehicle finish. A minimum value of 60 on horizontal surface and minimum value of 50 on a vertical surface is desirable for automotive use.

Acrylic Polymer #1

To a 5-liter glass flask equipped with an agitator, thermometer, water condenser, nitrogen inlet and heating mantle was added 701.8 grams primary amyl acetate and 82.6 grams xylenes. This mixture was agitated and heated to reflux.

While maintaining the batch at reflux, a mixture of 232.4 grams styrene, 232.4 grams isobutyl methacrylate, 907 grams isodecyl acrylate, 930.2 grams TONE® M100 monomer, 23.2 grams acrylic acid, 62.9 grams VAZO® 67, 60.3 grams xylenes and 567.5 grams primary amyl acetate was added over a 270 minute period. After this add was completed an additional 112.9 grams of primary amyl acetate was added. The weight solids of the resulting polymer solution was 59.0% and the Gardner-Holdt viscosity measured at 25 C was B+½. Weight average molecular weight of the polymer was 11190 and polydispersity was 2.91, determined by GPC.

Acrylic Polymer #2

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 478.4 grams n-butyl methacrylate, 540.7 grams tridecyl methacrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.3% and the Gardner-Holdt viscosity measured at 25 C was B+½. Weight average molecular weight of the polymer was 9228 and polydispersity was 3.07, determined by GPC.

Acrylic Polymer #3

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 207.9 grams n-butyl methacrylate, 811.2 grams tridecyl methacrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.5% and the Gardner-Holdt viscosity measured at 25 C was B-¼. Weight average molecular weight of the polymer was 7506 and polydispersity was 2.75, determined by GPC.

Acrylic Polymer #4

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 207.9 grams n-butyl methacrylate, 811.2 grams isodecyl methacrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.0% and the Gardner-Holdt viscosity measured at 25 C was B. Weight average molecular weight of the polymer was 7026 and polydispersity was 2.21, determined by GPC.

Acrylic Polymer #5

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 478.4 grams n-butyl methacrylate, 540.7 grams isodecyl methacrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 58.9% and the Gardner-Holdt viscosity measured at 25 C was B. Weight average molecular weight of the polymer was 7155 and polydispersity was 2.28, determined by GPC.

Acrylic Polymer #6

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 478.4 grams n-butyl methacrylate, 540.7 grams isooctyl acrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 57.5% and the Gardner-Holdt viscosity measured at 25 C was B. Weight average molecular weight of the polymer was 10209 and polydispersity was 2.77, determined by GPC.

Acrylic Polymer #7

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 207.9 grams n-butyl methacrylate, 811.2 grams isooctyl acrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.1% and the Gardner-Holdt viscosity measured at 25 C was B. Weight average molecular weight of the polymer was 10119 and polydispersity was 2.79, determined by GPC.

Acrylic Polymer #8

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 207.9 grams n-butyl methacrylate, 811.2 grams octyl/decyl acrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 58.8% and the Gardner-Holdt viscosity measured at 25 C was B–⅓. Weight average molecular weight of the polymer was 10473 and polydispersity was 2.81, determined by GPC.

Acrylic Polymer #9

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 478.4 grams n-butyl methacrylate, 540.7 grams octyl/decyl acrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.3% and the Gardner-Holdt viscosity measured at 25 C was B+¼. Weight average molecular weight of the polymer was 9108 and polydispersity was 2.60, determined by GPC.

Acrylic Polymer #10

To a 5-liter glass flask equipped with an agitator, thermometer, water condenser, nitrogen inlet and heating mantle was added 627.7 grams primary amyl acetate and 73.9 grams xylenes. This mixture was agitated and heated to reflux. While maintaining the batch at reflux, a mixture of 207.9 grams styrene, 478.4 grams n-butyl methacrylate, 540.7 grams isodecyl acrylate, 832.0 grams TONE® M100 monomer, 20.8 grams acrylic acid, 56.3 grams VAZO® 67, 53.9 grams xylenes and 507.6 grams primary amyl acetate was added over a 270 minute period. After this add was completed an additional 101.0 grams of primary amyl acetate was added. The weight solids of the resulting polymer solution was 59.5% and the Gardner-Holdt viscosity measured at 25 C was B+½. Weight average molecular weight of the polymer was 9106 and polydispersity was 2.57, determined by GPC.

Acrylic Polymer #11

To a glass flask equipped with an agitator, thermometer, water condenser, nitrogen inlet and heating mantle was added 1347 grams of amyl acetate and 147.5 grams xylenes. This mixture was agitated and heated to reflux. A mixture of 240 grams of styrene, 240 grams of butyl methacrylate, 960 grams of TONE® M-100, 936 grams of isotridecyl methacrylate, 24 grams of acrylic acid, and 36 grams of VAZO® 67 was added over a 4 hour period. After this addition was complete, then mixture was stirred for 30 minutes and a mixture of 12 grams of VAZO® 67 in 96 grams of amyl acetate was added over a 20 minute period. The reaction was then held at reflux for an additional 2 hours then cooled to room temperature.

The molecular weight was determined by GPC to be 13,854, the viscosity was 126 centipoise at 26° C., and the totals solids was 60%.

Acrylic Polymer #12

To a flask equipped with an agitator, thermometer, water condenser, nitrogen inlet and heating mantle was added 1758.6 grams of SOLVESSO® 100. The solvent was heated to reflux. A mixture of 703.4 grams of 1,6-hexanediol diacrylate, 3033.6 grams of isobornyl acrylate, 659.5 2-hydroxyethyl methacrylate, and 44 grams of tert-butyl peroxy acetate in 703.4 grams of SOLVESSO® 100 was added over a 300 minute period. When the addition was complete, the reaction was held at reflux for an additional 30 minutes and then a mixture of 885.3 grams of epsilon-caprolactone, 412.2 grams of SOLVESSO® 100, and 3.0 grams of dibutyltin dilaurate was added over a 30 minute period. The reaction was then held at reflux for an additional 3 hours. The mixture was then cooled to room temperature and filled out. The weight solids of the resulting polymer solution was 65.8% and the Gardner-Holdt viscosity (ASTM D1545-98) measured at 25° C. was X. Weight average molecular weight of the polymer was 37,690 and polydispersity was 11, determined by GPC.

Acrylic Polymer #13

To a flask equipped with an agitator, thermometer, water condenser, nitrogen inlet and heating mantle was added 2963 grams of amyl acetate and 324.5 grams of xylene. The mixture was heated to reflux. A mixture of 792 grams of styrene, 528 grams of butyl methacrylate, 2640 grams of TONE® M-100, 1214.4 grams of butyl acrylate, 105.6 grams of acrylic acid, and 55 grams of VAZO® 67 was added over a 4 hour period. When the addition was complete, the reaction was held at reflux for an additional 30 minutes. A mixture of 17.6 grams of VAZO® 67 in 211.12 grams of amyl acetate was added over a 20 minute period. When the addition was complete, the reaction was held at reflux for an additional 2 hours. The mixture was cooled to room temperature and filled out. The resulting polymer solution was a clear polymer solution, and had a solids content of 60% and a Brookfield viscosity of 454 centipoise at 25° C. The polymer had a 49,173 Mw (weight average molecular weight) and a 5,866 Mn (number average molecular weight).

Acrylic Polymer #14

To a 5-liter glass flask equipped with an agitator, thermometer, water condenser, nitrogen inlet and heating mantle was added 666 grams of SOLVESSO® 100. This mixture was agitated and heated to reflux. While maintaining the batch at reflux, a mixture of 1473.8 grams of n-butyl methacrylate, 982.5 grams of hydroxypropyl acrylate, in 31 grams SOLVESSO® 100 was added over a 180 minute period. A separate addition of 15.9 grams t-butyl peroxyacetate in 89.5 grams SOLVESSO® 100 was added simultaneously over a 195 minute period. After the additions were completed, 220.5 grams of SOLVESSO® 100 was added to the reaction mixture. Then the reaction mixture was held at reflux for an additional 40 minutes. The weight solids of the resulting polymer solution was 69.4% and the Gardner-Holdt viscosity measured at 25 C was Z. Weight average molecular weight of the polymer was 6,485 and polydispersity was 1.99, determined by GPC using polystyrene standards.

TABLE 1

|  | Weight percent C8 or higher acrylate monomer | Weight Percent polyester extended monomer | Weight percent C8 or higher monomer and polyester extended monomer |
|---|---|---|---|
| Acrylic Polymer #1 | 39 | 40 | 79 |
| Acrylic Polymer #2 | 26 | 40 | 66 |

TABLE 1-continued

| | Weight percent C8 or higher acrylate monomer | Weight Percent polyester extended monomer | Weight percent C8 or higher monomer and polyester extended monomer |
|---|---|---|---|
| Acrylic Polymer #3 | 39 | 40 | 79 |
| Acrylic Polymer #4 | 39 | 40 | 79 |
| Acrylic Polymer #5 | 26 | 40 | 66 |
| Acrylic Polymer #6 | 26 | 40 | 66 |
| Acrylic Polymer #7 | 39 | 40 | 79 |
| Acrylic Polymer #8 | 39 | 40 | 79 |
| Acrylic Polymer #9 | 26 | 40 | 66 |
| Acrylic Polymer #10 | 26 | 40 | 66 |
| Acrylic Polymer #11 | 39 | 40 | 79 |

Preparation of Diurea Dispersion #1

53 grams of benzyl amine was added to 3000 grams of acrylic polymer #11. The mixture was stirred for 5 minutes. 41.7 grams of hexamethylene diisocyanate was added all at once to this mixture. When the addition was complete, the mixture was stirred for 8 minutes and used as is.

Preparation of Diurea Dispersion #2

53 grams of benzyl amine was added to 3000 grams of acrylic polymer #1. The mixture was stirred for 5 minutes. 41.7 grams of hexamethylene diisocyanate was added all at once to this mixture. When the addition was complete, the mixture was stirred for 8 minutes and used as is.

GARAMITE® Dispersion

N-butyl propionate, 54.40 parts was added to a mixing mill under a nitrogen atmosphere. 7.60 parts of GARAMITE® was added with stirring. After stirring for 20 minutes, 38.0 parts of acrylic polymer #14 was added. After stirring for 60 minutes, the mixture was passed through the mill three times using zirconia media (0.8-1.0 mm).

3-Wet Primer Composition

The following ingredients were added to a suitable mixing vessel in the order given. All amounts are in parts by weight.

| | |
|---|---|
| Carbon Black Pigment dispersion | 0.46 |
| White pigment dispersion | 18.62 |
| Butyl Acetate | 1.96 |
| Isopropanol | 8.61 |
| NACURE ® XP-221 | 1.47 |
| CYMEL ® 1168 | 9.01 |
| Diurea dispersion #2 | 12.27 |
| Acrylic Polymer #12 | 23.03 |
| Barium sulfate pigment dispersion | 3.50 |
| Acrylic polymer #13 | 12.78 |
| GARAMITE ® dispersion | 4.12 |
| TINUVIN ® 123 | 0.48 |
| TINUVIN ® 328 | 3.69 |

Basecoat Compositions 1-11

Silver metallic basecoat compositions were produced by mixing together the ingredients in TABLE 2 in a suitable mixing vessel in the order shown. All amounts are in parts by weight.

| | Basecoat Compositions | | | | | | | | | | |
|---|---|---|---|---|---|---|---|---|---|---|---|
| | 1 | 2 | 3 | 4 | 5 | 6 | 7 | 8 | 9 | 10 | 11 |
| Acrylic Polymer #1 | 7.71 | | | | | | | | | | |
| Acrylic Polymer #2 | | 7.71 | | | | | | | | | |
| Acrylic Polymer #3 | | | 7.71 | | | | | | | | |
| Acrylic Polymer #4 | | | | 7.71 | | | | | | | |
| Acrylic Polymer #5 | | | | | 7.71 | | | | | | |
| Acrylic Polymer #6 | | | | | | 7.71 | | | | | |
| Acrylic Polymer #7 | | | | | | | 7.71 | | | | |
| Acrylic Polymer #8 | | | | | | | | 7.71 | | | |
| Acrylic Polymer #9 | | | | | | | | | 7.71 | | |

-continued

| | Basecoat Compositions | | | | | | | | | | |
|---|---|---|---|---|---|---|---|---|---|---|---|
| | 1 | 2 | 3 | 4 | 5 | 6 | 7 | 8 | 9 | 10 | 11 |
| Acrylic Polymer #10 | | | | | | | | | | 7.71 | |
| Acrylic Polymer #11 | | | | | | | | | | | 7.71 |
| CYMEL ® 1168 | 16.68 | 16.68 | 16.68 | 16.68 | 16.68 | 16.68 | 16.68 | 16.68 | 16.68 | 16.68 | 16.68 |
| Xylene | 11.01 | 11.01 | 11.01 | 11.01 | 11.01 | 11.01 | 11.01 | 11.01 | 11.01 | 11.01 | 11.01 |
| TINUVIN ® 079L | 0.65 | 0.65 | 0.65 | 0.65 | 0.65 | 0.65 | 0.65 | 0.65 | 0.65 | 0.65 | 0.65 |
| TINUVIN ® 328 | 1.74 | 1.74 | 1.74 | 1.74 | 1.74 | 1.74 | 1.74 | 1.74 | 1.74 | 1.74 | 1.74 |
| NACURE ® XP-221 | 1.04 | 1.04 | 1.04 | 1.04 | 1.04 | 1.04 | 1.04 | 1.04 | 1.04 | 1.04 | 1.04 |
| GARAMITE ® Dispersion | 5.51 | 5.51 | 5.51 | 5.51 | 5.51 | 5.51 | 5.51 | 5.51 | 5.51 | 5.51 | 5.51 |
| Diurea dispersion #1 | 27.53 | 27.53 | 27.53 | 27.53 | 27.53 | 27.53 | 27.53 | 27.53 | 27.53 | 27.53 | 27.53 |
| Methyl Alcohol | 1.42 | 1.42 | 1.42 | 1.42 | 1.42 | 1.42 | 1.42 | 1.42 | 1.42 | 1.42 | 1.42 |
| N-Methyl-2 Pyrrolidone | 1.05 | 1.05 | 1.05 | 1.05 | 1.05 | 1.05 | 1.05 | 1.05 | 1.05 | 1.05 | 1.05 |
| Isobutyl Alcohol | 1.43 | 1.43 | 1.43 | 1.43 | 1.43 | 1.43 | 1.43 | 1.43 | 1.43 | 1.43 | 1.43 |
| Aluminum Dispersion | 24.23 | 24.23 | 24.23 | 24.23 | 24.23 | 24.23 | 24.23 | 24.23 | 24.23 | 24.23 | 24.23 |

Coating Examples 1-10

To prepare panels for coating with the basecoat compositions 1-10, phosphatized steel panels were coated with a cathodic epoxy resin based electrocoat (CORMAX® 6 ED from DuPont Company, Wilmington, Del.). The resulting electrocoat was cured to achieve a film build of 23 microns. Each panel was then coated with 3-Wet primer composition and flashed at ambient temperature for 90 seconds to remove a portion of the solvent.

Basecoat compositions 1-10 were applied to two panels in two layers with a one-minute ambient temperature flash between each coat. After coating with the basecoat compositions, the panels were flashed at ambient temperature for 3 minutes. Two layers of clearcoat composition (GEN 4 ES® clearcoat available from DuPont, Wilmington, Del.) were applied to each of the panels with a one-minute flash period between coats at ambient temperature. For each basecoat, one panel was flashed for 5 minutes at ambient temperature and cured in a horizontal position in a drying oven at 140° C. for 30 minutes. The other panel was flash dried for 5 minutes at ambient temperature and cured in a vertical position in a drying oven at 140° C. for 30 minutes.

Coating Example 11

Phosphatized steel panels were coated with a cathodic epoxy resin based electrocoat (CORMAX® 6 ED from DuPont Company, Wilmington, Del.). The resulting electrocoat was cured to achieve a film build of 23 microns. Each panel was then coated with 3-Wet primer composition and flashed at ambient temperature for 3 minutes to remove a portion of the solvent.

Basecoat composition 11 was applied to a panel in two layers with a one-minute ambient temperature flash between each coat. After coating with the basecoat composition, the panel was flashed at ambient temperature for 3 minutes. Two layers of clearcoat composition (GEN 4 ES® clearcoat available from DuPont, Wilmington, Del.) were applied to the panel with a one-minute flash period between coats at ambient temperature. The panel was flashed for 5 minutes at ambient temperature and cured in a horizontal position in a drying oven at 140° C. for 30 minutes.

TABLE 3

| Coating example | Bake position[1] | Flop | CF number |
|---|---|---|---|
| 1 | V | 13.0 | 55.0 |
| | H | 13.0 | 56.0 |
| 2 | V | 10.0 | 46.0 |
| | H | 11.0 | 48.0 |
| 3 | V | 13.0 | 49.0 |
| | H | 13.0 | 52.0 |
| 4 | V | 12.7 | 51.0 |
| | H | 13.0 | 54.0 |
| 5 | V | 12.9 | 50.0 |
| | H | 12.7 | 52.0 |
| 6 | V | 12.0 | 51.0 |
| | H | 12.0 | 53.0 |
| 7 | V | 12.8 | 48.0 |
| | H | 12.9 | 51.0 |
| 8 | V | 13.0 | 53.0 |
| | H | 13.0 | 55.1 |
| 9 | V | 12.9 | 49.0 |
| | H | 12.9 | 54.0 |
| 10 | V | 12.7 | 48.0 |
| | H | 12.5 | 50.0 |
| 11 | H | 16.3 | 61 |

[1]"V" denotes baking in a vertical position. "H" denotes baking in a horizontal position.

Basecoat Composition 12

A silver metallic basecoat composition was produced by mixing together the ingredients in a suitable mixing vessel in the order shown. All amounts are in parts by weight.

| | |
|---|---|
| CYMEL ® 1168 | 15.20 |
| SOLVESSO ® 100 | 7.09 |
| Butyl acetate | 6.13 |
| Acrylic Polymer #1 | 7.37 |
| N-methyl-2-pyrrolidone | 0.96 |
| TINUVIN ® 079L | 0.24 |
| TINUVIN ® 328 | 1.59 |
| NACURE ® XP-221 | 0.95 |
| GARAMITE ® dispersion | 5.51 |
| Methyl alcohol | 2.61 |
| Aluminum dispersion | 7.33 |
| ATA TCR 2040A Aluminum paste | 14.72 |
| Propanol | 4.00 |
| Diurea dispersion #2 | 26.30 |

Coating Examples 12-15

Preparation of Primed Panels Using a Commercial Baking Primer

Phosphatized steel panels were coated with a cathodic epoxy resin based electrocoat (CORMAX® 6 ED from DuPont Company, Wilmington, Del.). The resulting electrocoat was cured to achieve a film build of 23 microns.

These panels were then coated with a layer of primer composition, Titanium Primer 708A01244, available from DuPont, Wilmington, Del. Each primed panel was then flashed for 10 minutes at ambient temperature and cured in a drying oven at 140° C. for 30 minutes. The panels were then cooled to ambient temperature.

Coating 12

Comparative

A single layer of Silver Birch basecoat (a polyester based basecoat composition available from DuPont as 647A 0111) was spray applied on a previously primed steel panel (prepared above). After coating, the panel was flashed for 3 minutes at ambient temperature. Two layers of clearcoat composition (GEN 4 ES® clearcoat available from DuPont, Wilmington, Del.) were applied to the panel with a one-minute flash period between coats at ambient temperature. The panel was flashed for 10 minutes at ambient temperature and cured in a vertical position in a drying oven at 140° C. for 20 minutes.

Coating 13

Control

Silver Birch basecoat composition was applied on a previously primed steel panel (prepared above). The panel was flashed for 3 minutes at ambient temperature and a second coat of Silver Birch basecoat was applied. After a 3 minute flash at ambient temperature, two layers of clearcoat composition (GEN 4 ES® clearcoat available from DuPont, Wilmington, Del.) were applied to the panel with a one-minute flash period between coats at ambient temperature. The panel was flashed for 10 minutes at ambient temperature and cured in a vertical position in a drying oven at 140° C. for 20 minutes.

Coating 14

Basecoat composition 12 was applied on a previously prepared primed steel panel (prepared above). The panel was flashed for 3 minutes at ambient temperature. Two layers of clearcoat composition (GEN 4 ES® clearcoat available from DuPont, Wilmington, Del.) were applied to the panel with a one-minute flash period between coats at ambient temperature. The panel was flashed for 10 minutes at ambient temperature and cured in a vertical position in a drying oven at 140° C. for 20 minutes.

Coating 15

Basecoat composition 12 was applied on a previously prepared primed steel panel (prepared above). The panel was flashed for 3 minutes at ambient temperature and a second coat of Basecoat composition 12 was applied. After a 3 minute flash at ambient temperature, two layers of clearcoat composition (GEN 4 ES® clearcoat available from DuPont, Wilmington, Del.) were applied to the panel with a one-minute flash period between coats at ambient temperature. The panel was flashed for 10 minutes at ambient temperature and cured in a vertical position in a drying oven at 140° C. for 20 minutes.

Preparation of 3-Wet Primed Panels

Phosphatized steel panels were coated with a cathodic epoxy resin based electrocoat (CORMAX® 6 ED from DuPont Company, Wilmington, Del.). The resulting electrocoat was cured to achieve a film build of 23 microns. Each panel was then coated with 3-Wet primer composition and flashed at ambient temperature for 3 minutes to remove a portion of the solvent.

Coating 16

A 3-wet primed panel (prepared above) was coated with 1 coating of basecoat composition 12 and flashed for 3 minutes at ambient temperature. Two layers of clearcoat composition (GEN 4 ES® clearcoat available from DuPont, Wilmington, Del.) were applied to the panel with a one-minute flash period between coats at ambient temperature. The panel was flashed for 2 minutes at ambient temperature and placed in a drying oven at 93° C. in a vertical position. The temperature in the drying oven was increased to 140° C. over an 8 minute period. The panel was then kept at 140° C. for 12 minutes.

Coating 17

A 3-wet primed panel (prepared above) was coated with two coats of basecoat composition 12 with a 3 minute flash at ambient temperature between applications. The panel was then flashed for 3 minutes and two layers of clearcoat composition (GEN 4 ES® clearcoat available from DuPont, Wilmington, Del.) were applied to the panel with a one-minute flash period between coats at ambient temperature. The panel was flashed for 2 minutes at ambient temperature and placed in a drying oven at 93° C. in a vertical position. The temperature in the drying oven was increased to 140° C. over an 8 minute period. The panel was then kept at 140° C. for 12 minutes.

The results of these panels are summarized in Table 4.

TABLE 4

| Coating Example | Flop | CF Number |
|---|---|---|
| 12 (comparative) | 9.48 | 51.0 |
| 13 (control) | 12.05 | 50.5 |

TABLE 4-continued

| Coating Example | Flop | CF Number |
| --- | --- | --- |
| 14 | 11.21 | 53.2 |
| 15 | 13.19 | 50.1 |
| 16 | 10.65 | 50.2 |
| 17 | 12.81 | 51.1 |

What is claimed is:

1. A process for forming a multi-layer coating comprising sequentially applying directly onto a layer of a cured electrocoat composition, a layer of a primer composition, a layer of a basecoat composition and a layer of a clearcoat composition; and simultaneously curing the applied layers by heating;
wherein the basecoat composition comprises a crosslinkable component, a crosslinking component, an organic liquid carrier, and optionally pigment; wherein
a) the crosslinkable component comprises an acrylic polyol wherein the acrylic polyol comprises at least one linear or branched C8 or higher alkyl acrylate monomer, and at least one polyester-extended acrylate monomer, and
b) the crosslinking component comprises at least one of the group selected from melamine, aminoplast resin, amino resin, polyisocyanate, blocked polyisocyanate, or a combination thereof; and
wherein the total weight percentage of the linear or branched C8 or higher alkyl acrylate monomer and polyester-extended acrylate monomer is at least 40 percent by weight based on the total weight of the acrylic polyol; wherein the applied layer of primer composition and the applied layer of basecoat composition resist intermixing;
and wherein said curing is the first curing for each of the applied primer, basecoat, and clearcoat layers; and
wherein the primer composition comprises a crosslinkable primer component and a crosslinking primer component wherein the crosslinkable primer component comprises about 40 to 95 percent by weight, based on the total weight of the crosslinkable primer component and the crosslinking primer component, of a film-forming acrylic polymer component comprising two acrylic polymers, the first being a polyester-extended branched acrylic polymer and the second being a polyester-extended linear acrylic polymer, the polymers being provided in a relative weight ratio of from about 5:95 to 95:5; and wherein the crosslinking primer component comprises about 5 to 60 percent by weight, based on the total weight of the crosslinkable primer component and the crosslinking primer component, of an aminoplast resin, a blocked polyisocyanate resin, or a combination thereof.

2. The process of claim 1 wherein the primer composition is free from or essentially free from nonaqueous dispersion polymers.

3. The process of claim 1 wherein the process further comprises a flash step between the application of the layer of basecoat composition and the layer of clearcoat composition.

4. The process of claim 1 wherein the process further comprises a flash step between the application of the layer of primer composition and the layer of basecoat composition.

5. The process of claim 1 wherein said at least one linear or branched C8 or higher alkyl acrylate monomer comprises in the range of from 10 percent to 60 percent by weight of the acrylic polyol.

6. The process of claim 1 wherein said at least one linear or branched C8 or higher acrylate monomer is chosen from the group consisting of octyl acrylate, octyl methacrylate, nonyl acrylate, nonyl methacrylate, decyl acrylate, decyl methacrylate, undecyl acrylate, undecyl methacrylate, dodecyl acrylate, dodecyl methacrylate, isodecyl acrylate, isodecyl methacrylate, isotridecyl acrylate, isotridecyl methacrylate, tridecyl acrylate, tridecyl methacrylate, tridecyl acrylate, tridecyl methacrylate, stearyl acrylate, and stearyl methacrylate, lauryl acrylate, lauryl methacrylate, or a combination thereof.

7. The process of claim 1 wherein the crosslinking component comprises a melamine.

8. The process of claim 1 wherein said at least one polyester extended acrylate monomer is the product of the reaction between a 2-hydroxyethyl methacrylate or 2-hydroxyethyl acrylate and caprolactone.

* * * * *